United States Patent
Ranganathan et al.

(10) Patent No.: US 9,632,763 B2
(45) Date of Patent: Apr. 25, 2017

(54) SHARING OF FLOWS IN A STREAM PROCESSING SYSTEM

(75) Inventors: Anand Ranganathan, Stamford, CT (US); Anton V. Riabov, Ossining, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1504 days.

(21) Appl. No.: 13/043,891

(22) Filed: Mar. 9, 2011

(65) Prior Publication Data
US 2012/0233590 A1    Sep. 13, 2012

(51) Int. Cl.
G06F 9/455    (2006.01)
G06F 9/445    (2006.01)
G06F 3/0484   (2013.01)
G06F 9/44     (2006.01)

(52) U.S. Cl.
CPC ............ G06F 8/60 (2013.01); G06F 3/04842 (2013.01); G06F 8/30 (2013.01)

(58) Field of Classification Search
CPC ..... G06F 8/10; G06F 8/20; G06F 8/30; G06F 8/34; G06F 8/36; G06F 8/60; G06F 3/04842
See application file for complete search history.

(56) References Cited

U.S. PATENT DOCUMENTS 6,789,252 B1 *  9/2004  Burke ....................... G06F 8/10
                                                     717/100
6,938,240 B2 *  8/2005  Charisius et al. ............ 717/104
7,272,820 B2 *  9/2007  Klianev ........................ 717/109
7,401,331 B2    7/2008  Leung
(Continued)

FOREIGN PATENT DOCUMENTS

WO    03005243    1/2003
WO    03017098    2/2003

OTHER PUBLICATIONS

Bouillet et al., Mario: Middleware for Assembly and Deployment of Multi-Platform Flow-Based Applications, Middleware '09 Urbana Champaign, IL, pp. 1-7.
(Continued)

*Primary Examiner* — Li B Zhen
*Assistant Examiner* — Bradford Wheaton
(74) *Attorney, Agent, or Firm* — Ryan, Mason & Lewis, LLP

(57) ABSTRACT

Techniques for generating code for a flow are provided. The techniques include receiving a flow for an application to be deployed, wherein the flow comprises one or more sub-flows, identifying sub-flows of the flow that match existing sub-flows that are already running in separate flows by querying a run-time flow information repository, generating code for the flow, wherein the code comprises newly generated code for each of the sub-flows that do not match existing sub-flows that are already running in separate flows, and wherein the code also comprises one or more connectors to matching sub-flows that are already running in separate flows in lieu of generating new code for the sub-flows that match existing sub-flows that are already running in separate flows, and deploying the generated code for the flow and updating the run-time flow information repository with information pertaining to the flow.

25 Claims, 13 Drawing Sheets

(56) References Cited

U.S. PATENT DOCUMENTS

| | | | |
|---|---|---|---|
| 8,099,480 B1* | 1/2012 | Muthusrinivasan et al. | 709/222 |
| 2002/0147606 A1* | 10/2002 | Hoffmann et al. | 705/1 |
| 2003/0046282 A1 | 3/2003 | Carlson et al. | |
| 2006/0074732 A1* | 4/2006 | Shukla et al. | 705/8 |
| 2006/0112062 A1* | 5/2006 | Leymann et al. | 707/1 |
| 2007/0033567 A1 | 2/2007 | Carlson et al. | |
| 2007/0276714 A1* | 11/2007 | Beringer | 705/7 |
| 2009/0094572 A1 | 4/2009 | Hedge et al. | |
| 2009/0112939 A1* | 4/2009 | Sanghvi et al. | 707/201 |
| 2009/0300580 A1* | 12/2009 | Heyhoe et al. | 717/106 |
| 2010/0281462 A1* | 11/2010 | Festa | 717/108 |
| 2011/0107273 A1* | 5/2011 | Ranganathan et al. | 715/854 |
| 2011/0179058 A1* | 7/2011 | Purcell et al. | 707/769 |
| 2011/0289515 A1* | 11/2011 | Hung et al. | 719/318 |

OTHER PUBLICATIONS

Ranganathan et al., Mashup-based Information Retrieval for Domain Experts, CIKM'09, Nov. 2-9, 2009, Hong Kong China, pp. 1-10.

Krueger, Software Reuse, ACM Computing Surveys, vol. 24, No. 2, Jun. 1992, pp. 131-183.

\* cited by examiner

SHARING OF FLOWS IN A STREAM PROCESSING SYSTEM

GOVERNMENT CONTRACT

This invention was made with Government support under Contract No.: H98230-07-C-0383 awarded by the United States Department of Defense. The Government has certain rights in this invention.

FIELD OF THE INVENTION

Embodiments of the invention generally relate to information technology, and, more particularly, to stream processing flows.

BACKGROUND OF THE INVENTION

Tools that create information/data processing flows have become useful in enabling enterprise analysts and developers to create applications to respond to immediate enterprise needs. Existing tools generally require the following steps: creating applications as information processing flows from sets of data sources and components; based on the created or generated flow, assembling the executable application to run the flow (assembly system); and deploying the application to one or multiple execution environments (deployment system).

Existing tools make the assumption that each such flow, be it manually created or automatically generated, is an independent entity from other flows created in the past by the same user or group of users. This assumption, however, does not hold for two very common scenarios:

(i) components that have special resource (central processing unit (CPU)/memory) requirements and therefore should be shared between multiple flows. For example, a component that holds an in-memory database of special phone numbers and performs lookups against this database to determine if a phone call requires special handling (for example, toll-free or special toll calls);

(ii) components that have to gather data from multiple sources and maintain results/state based on their input data. For instance, a component that computes a price volatility index for stock prices in a given area for a long period of time (for example, a week or a month).

For either type of component described above, it would be desirable, in contrast to the existing approaches, for the creation of a new processing flow using this component, in many situations, to connect to the component if it is already running, instead of executing a new copy of the component.

SUMMARY OF THE INVENTION

Principles and embodiments of the invention provide techniques for sharing of flows in a stream processing system. An exemplary method (which may be computer-implemented) for generating code for a flow, according to one aspect of the invention, can include steps of receiving a flow for an application to be deployed, wherein the flow comprises one or more sub-flows, identifying one or more sub-flows of the flow that match one or more existing sub-flows that are already running in one or more separate flows by querying a run-time flow information repository, generating code for the flow, wherein the code comprises newly generated code for each of the one or more sub-flows that do not match one or more existing sub-flows that are already running in one or more separate flows, and wherein the code also comprises one or more connectors to one or more matching sub-flows that are already running in one or more separate flows in lieu of generating new code for the one or more sub-flows that match one or more existing sub-flows that are already running in one or more separate flows, and deploying the generated code for the flow and updating the run-time flow information repository with information pertaining to the flow.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
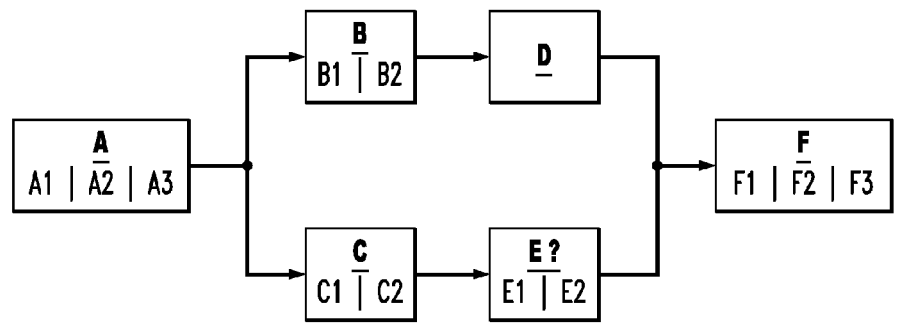
FIG. 1 is a diagram illustrating an example pattern, according to an embodiment of the invention.

Principles of the invention include techniques to use deployed artifacts in planning information processing flows. One or more embodiments of the invention include sharing of flows in a stream processing system, in which a dataflow graph is a series of operators. As detailed herein, sharing of flows is different than simply sharing code because the shared flow would already be running. The flows may also have a data state.

Sharing is useful, for example, when attempting to deal with shared input sub-flows (for instance, sources and filters/validators), shared output sub-flows, as well as shared inner sub-flows. Shared inner sub-flows can include, for example, components building a long-term state (for instance, model builders), as well as components that are stateless (for instance, edge detectors for images).

As used herein, a component can be of two types: a primitive component (meaning it has streams processing code as an implementation), or a graph component (also called a "composite"). A composite is essentially a subgraph, or sub-flow (that is, a set of other components, which in turn may contain other components, etc.). Both primitive components and composites (sub-flows) may be shared, but for simplicity, one or more examples detailed herein explain it for primitive components. It should be appreciated, however, that the techniques described herein work the same way for composites/sub-flows. Also, note that a sub-flow (or composite) can degenerate at the extreme into a primitive component (for example, in case it has a single primitive component in it; consider, by way of example, a graph with a single node).

One or more embodiments of the invention can include modifying an automated flow composer tool (for example, IBM's Automated Analytics Composer) to enable a composer to re-use running components in the plan. In an example embodiment of the invention, only those components designated by a developer by annotating them (for example, with a @shareable annotation) can be shared. One advantage of this is that, for a multi job complex application, a user can see a larger picture and connect to already existing pieces.

As also described herein, one or more embodiments of the invention include creating and running a new process flow, as well as checking to see if a component that is needed by the new process is already in use and executing that the new process flow can use instead of using a new set of code. Accordingly, software reuse is using existing software artifacts during construction of a new software system. The types of artifacts stored in component libraries can be matched and a program developer can use them instead of writing new code from scratch that would achieve the same result in a run-time environment that is already running.

As described herein, an identification of a multi-component development artifact to be shared is obtained in a development environment. Also, a remote receiver with whom components of the artifact are to be shared can be designated. Further, components of the artifact are shared with the remote receiver by automatically locating the components and sending the located components in a package with associated type descriptions. After the package is received, a check for conflicts is made, and acceptable components are merged into the local development environment.

As noted herein and in contrast to existing approaches, one or more embodiments of the invention include reusing application flows that are in execution at the time when a new automatically planned flow is about to be executed. As such, reuse involves running code at execution time, as opposed to reuse of source code/binaries at development time.

Additionally, the techniques described herein include annotating components or component patterns for information processing flows to indicate to a deployment system that an already-executing version of the component can be reused instead of deploying a new copy. Further, one or more embodiments of the invention include maintaining information on components and flows previously deployed (for a single user or a group of users), as well as enabling manually or automatically assembled flows to use long-running components that maintain state.

As detailed herein, in application environments, some jobs in an application can be long-running and generally deployed by a person with administrative privileges. Other jobs can be transitory; that is, they are deployed to address an immediate need and may be stopped when that need is met. As a result, such an application environment is that of a constantly morphing collection of jobs.

Accordingly, one or more embodiments of the invention enable a developer to develop an entire application as a single pattern, as well as facilitate an ability to visualize which elements of the application flow have already been deployed by other analysts and can be reused. As such, the techniques described herein can automatically segment an application into independent jobs and create import/export connections between the constituent parts, as well as recognizing, based, for example, on a developer's annotations, which jobs can be reused in the run-time by allowing new flows to connect to existing parts of previously deployed flows.

As detailed herein, certain long-running jobs/components (as well as certain state-maintaining jobs) can be referred to as "shareable." This is because if X is a long-running component accumulating state, X is going to be deployed the first time it is encountered in a flow, and then the running X will be "shared" with any subsequent flow containing it.

By way of example, in a flow pattern file, components that are going to live for a prolonged period of time in the run-time can be annotated with @share. In one or more embodiments of the invention, @share-ing can be done on a port by port basis, but for simplicity, in this particular example, assume that components have a single input and output, and a shareable component has both these ports marked with @share. Accordingly, applications can be deployed in one of three types of sharing contexts. One context includes private with no sharing, in which every job submitted is independent. Another context includes private with sharing, which is a context uniquely associated with a user identifier (ID) in flow composer tool. In such a context, one can share components (marked with @share), but only among one's own applications. For example, consider a flow A→B→C→D, and B and C are marked as @share. B and C will be deployed. The next flow is E→B→F→G. B will not be deployed a second time, but E will be connected to the existing B. Yet another context includes shared, in which the context is assigned to a group of users (or all users) who can share run-time components as in the private with sharing context noted above.

In one or more embodiments of the invention a deployment context can be selected from a list available to a developer, or a developer can be provided the opportunity to specify a default context.

FIG. 1 is a diagram illustrating an example pattern, according to an embodiment of the invention. By way of illustration, FIG. 1 depicts pattern components A, B, C, D, E, F (with E being optional). Each of these components has two or three variations, written on the second line (except D, which just has one variation). By way of example, in pattern language code in connection with the example pattern of FIG. 1, assume that B1, C, E have been marked as @share components (note both abstracts and platform-specific components can be marked as @share). Marking an abstract as @share means that all of its descendants are shareable.

Figure 2A:
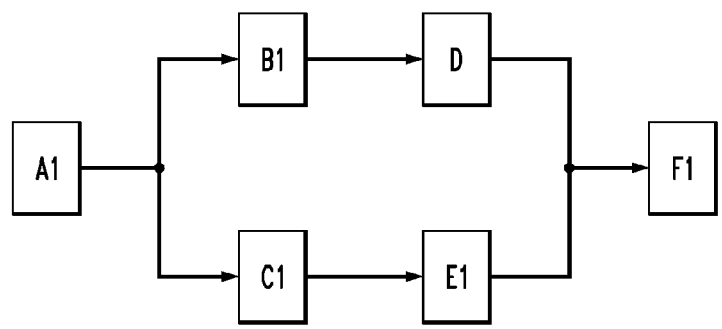
FIG. 2A through FIG. 2I are diagrams illustrating an example deployment scenario, according to an embodiment of the present invention.
Figure 2B:
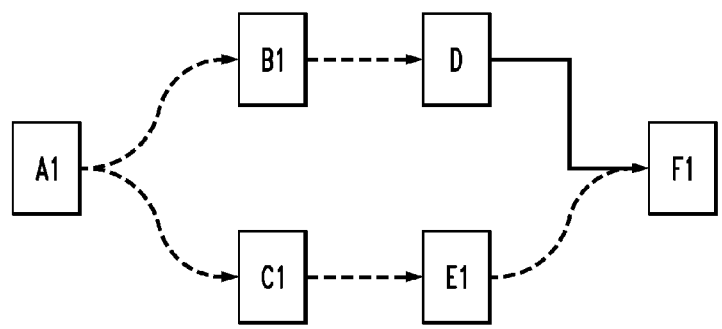

Accordingly, FIG. 2A through FIG. 2I proceed through example deployment scenarios in a shared context, according to an embodiment of the present invention. In FIG. 2A, the example flow created, for example, by user X is shown. As described herein within the context of this example, because B1, C1 and E1 are reusable, the jobs (for example, SPADE jobs) in the run-time will appear as depicted in FIG. 2B.

In FIG. 2B (and elsewhere), dashed arrows indicate subscriptions via import/export, while regular flow (within one application) connections are depicted through rectangular solid edges. Note that all connections incoming and outgoing out of a @shareable component are realized through imports and exports, because other jobs will need to connect to these components.

Figure 2C:
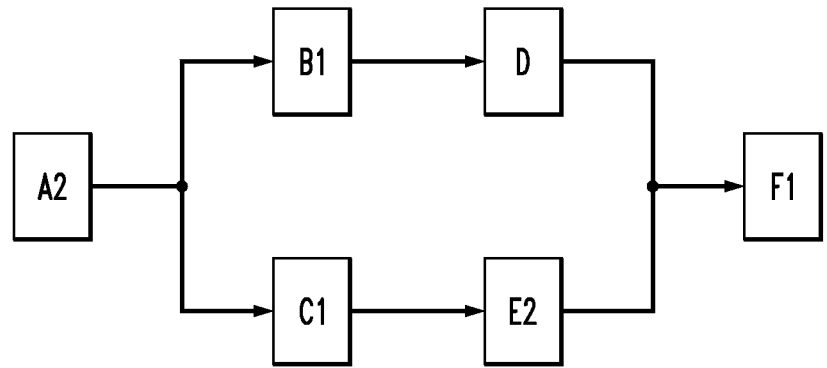
Figure 2D:
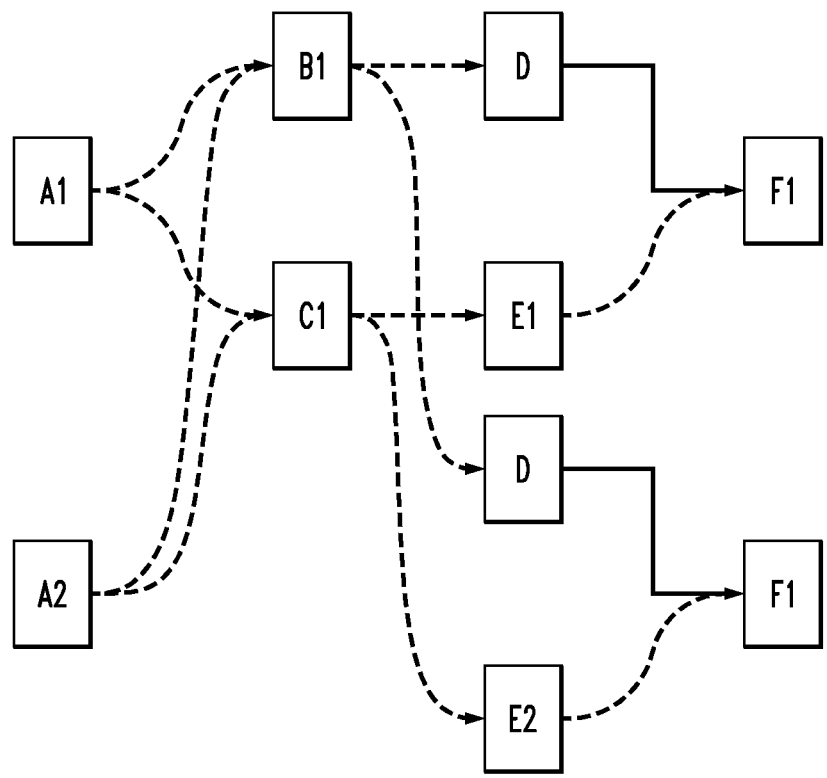

Additionally, FIG. 2C depicts a flow created by user Y. Accordingly, what is present in the run-time now appears as depicted in FIG. 2D. In FIG. 2D, note that B1 and C1 got reused, but D and F1 did not (because they are not marked with @share). As such, one or more embodiments of the invention include performing sub-graph matching to determine sub-flows that are already running.

Figure 2E:
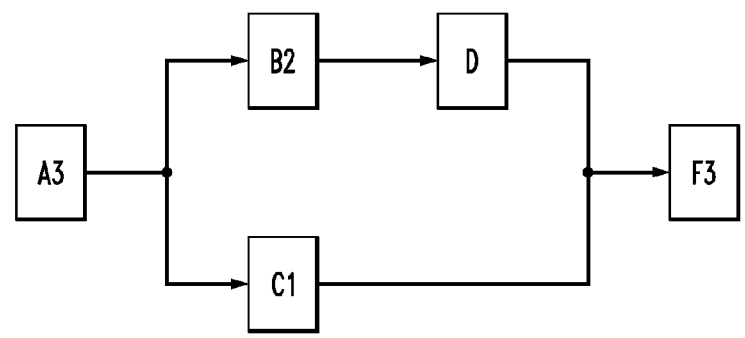
Figure 2F:
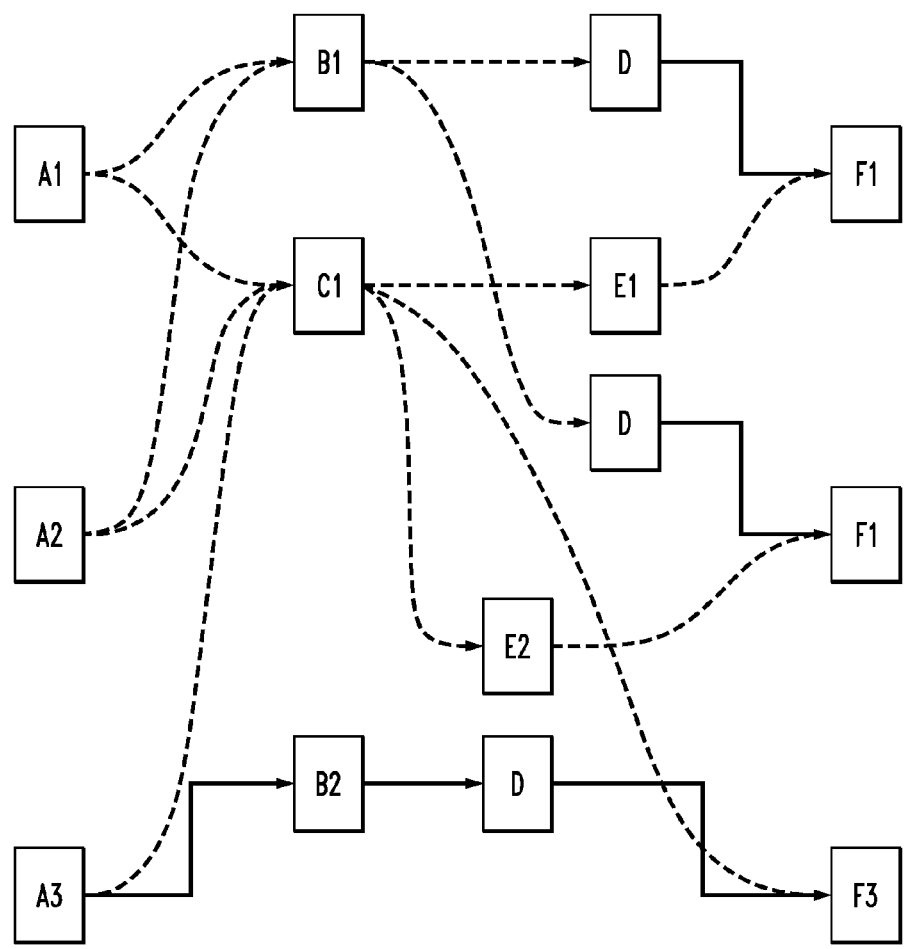

Further, user Z creates the flow depicted in FIG. 2E. Accordingly, the run-time now appears as depicted in FIG. 2F. In FIG. 2F, note that C1 got reused, but B2 is not reusable. Each block that is shareable will be generated as a separate job because its lifespan may be larger than the non-shareable blocks. Edges between a shareable block and a non-shareable block are generated as import statements in the job corresponding to the non-shareable block. Also, edges between two shareable blocks are generated as a separate job that imports from the first block and exports under a name the second shareable block is importing.

Figure 2G:
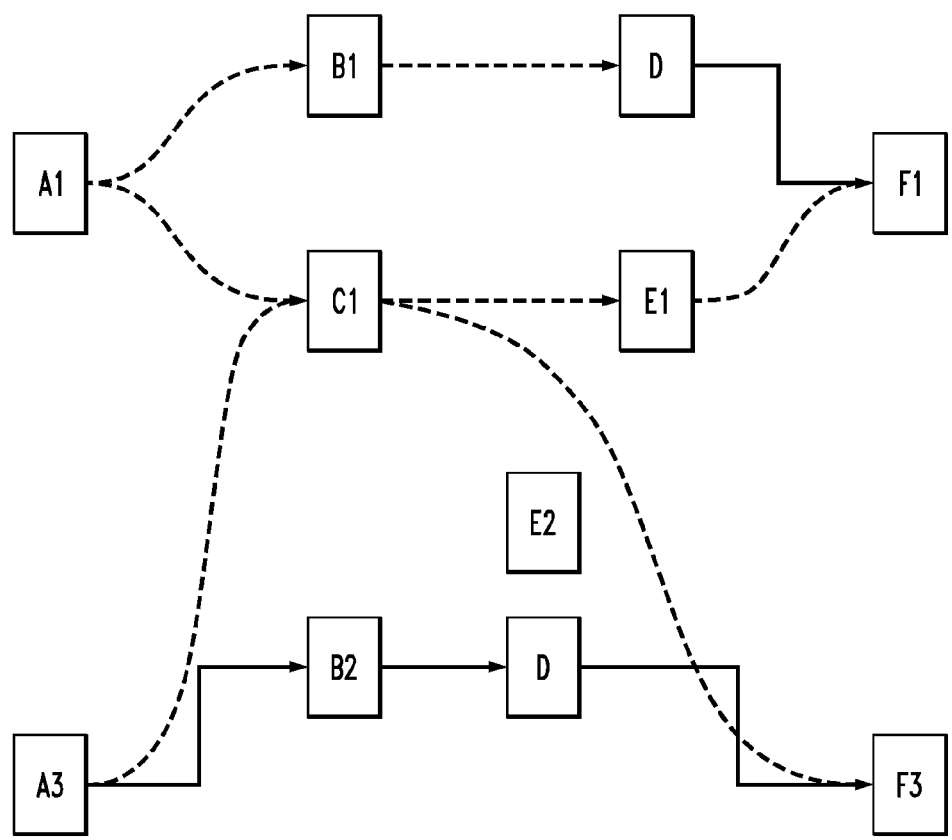
Figure 2H:
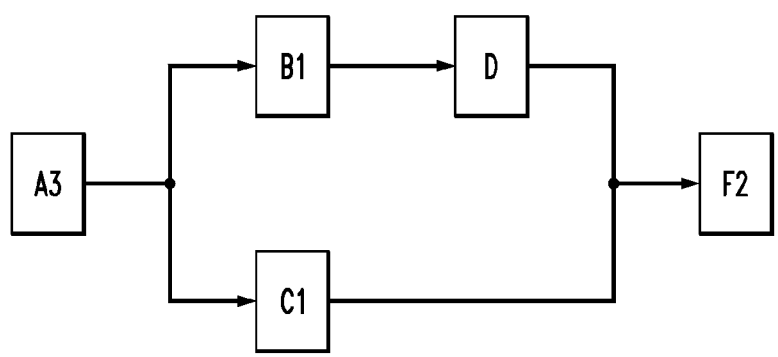
Figure 2I:
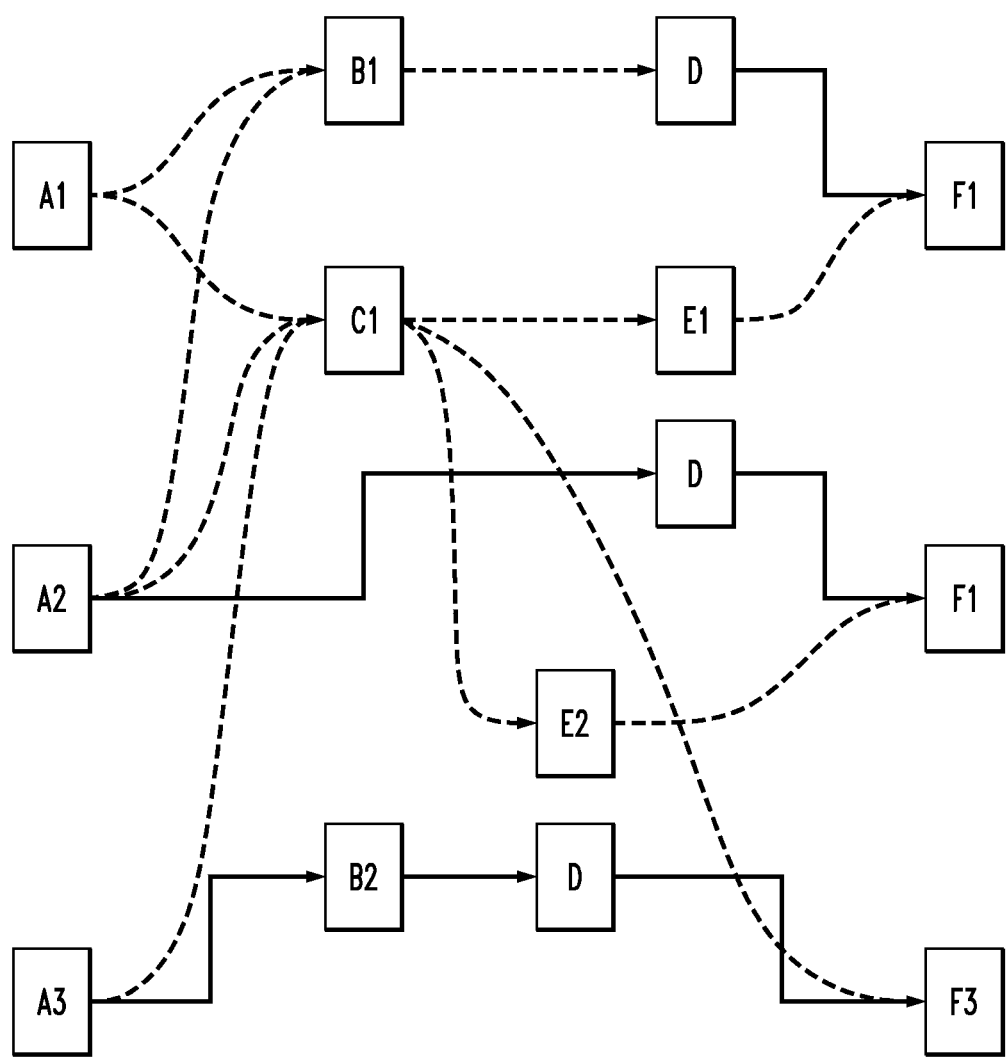

Continuing with the example, user Y now cancels his/her job, and the runtime appears as depicted in FIG. 2G. In FIG. 2G, note that all non-reusable components used by this application have been destroyed. E2 continues to run. Users can also reset the context, terminating all reusable components at once. Note also that the links between @share components created by this submission have also been deleted (for example, C1→E2). Further, user Y can submit a new job as depicted in FIG. 2H. The run-time will now appear as depicted in FIG. 2I.

As also described herein, one or more embodiments of the invention can include garbage collection. Garbage collection is a process through which long-running jobs that are part of some applications are terminated. There are several possibilities for when garbage collection can be performed. In one or more embodiments of the invention, a developer can specify individual garbage collection policies per component. The choices can include, for example, the following:

@gc-referenceCount mode will garbage collect components based on reference counters. The system will count the connections to a specific component. When that number reaches 0, the component is terminated automatically.

@gc-user mode will allow an enterprise analyst to "clean the current context," meaning destroying all components thus marked in that context.

@gc-admin mode will allow only the admin to clean components of this type.

@gc-never mode means a component will never be automatically stopped; it can, however, still be stopped using platform-specific tools (for example, a streamtool for InforSphere Streams).

Accordingly, shareable components can be destroyed within multiple frameworks. For further example, reusable components can be destroyed whenever all applications from that context have been destroyed (reference counting), as well as (as noted above) when manually specified by an admin. This latter option can include a Web page user interface (UI) that will list all contexts, number of applications currently deployed in each, number of reusable components still running in each, who submitted jobs in each context, etc. From there, the admin can terminate contexts manually, thus destroying all reusable components still running. There can also be an option to terminate all contexts.

Additionally, in one or more embodiments of the invention, users can reset the context that he or she is currently working in from a UI. Resetting the context that has active running inquiries only terminates components that are not currently contributing to any result.

The techniques described herein can additionally include incremental development to allow changes in composition patterns. In order to preserve long-running components from being destroyed whenever a flow pattern needs to be updated, one or more embodiments of the invention include implementing techniques to "recognize" components that have not been modified from previous flows.

Figure 3A:
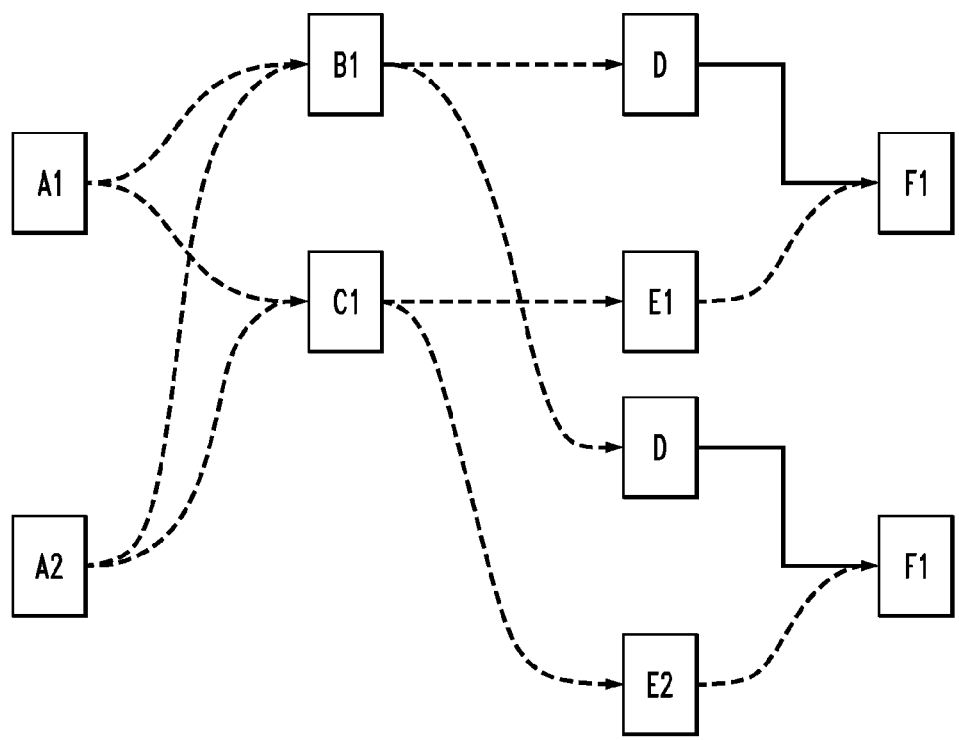
FIG. 3A through FIG. 3C are diagrams illustrating an example incremental development scenario, according to an embodiment of the present invention.
Figure 3B:
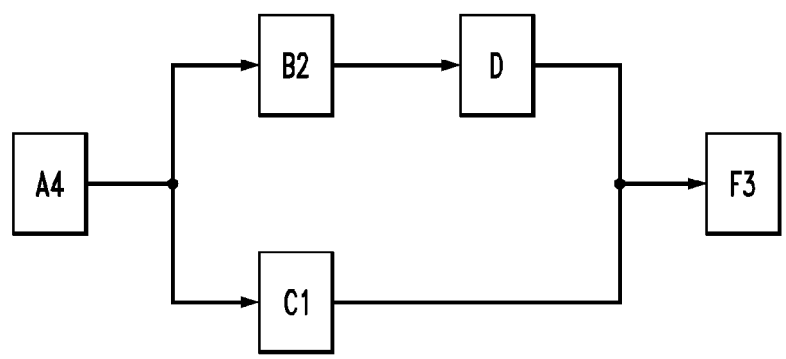
Figure 3C:
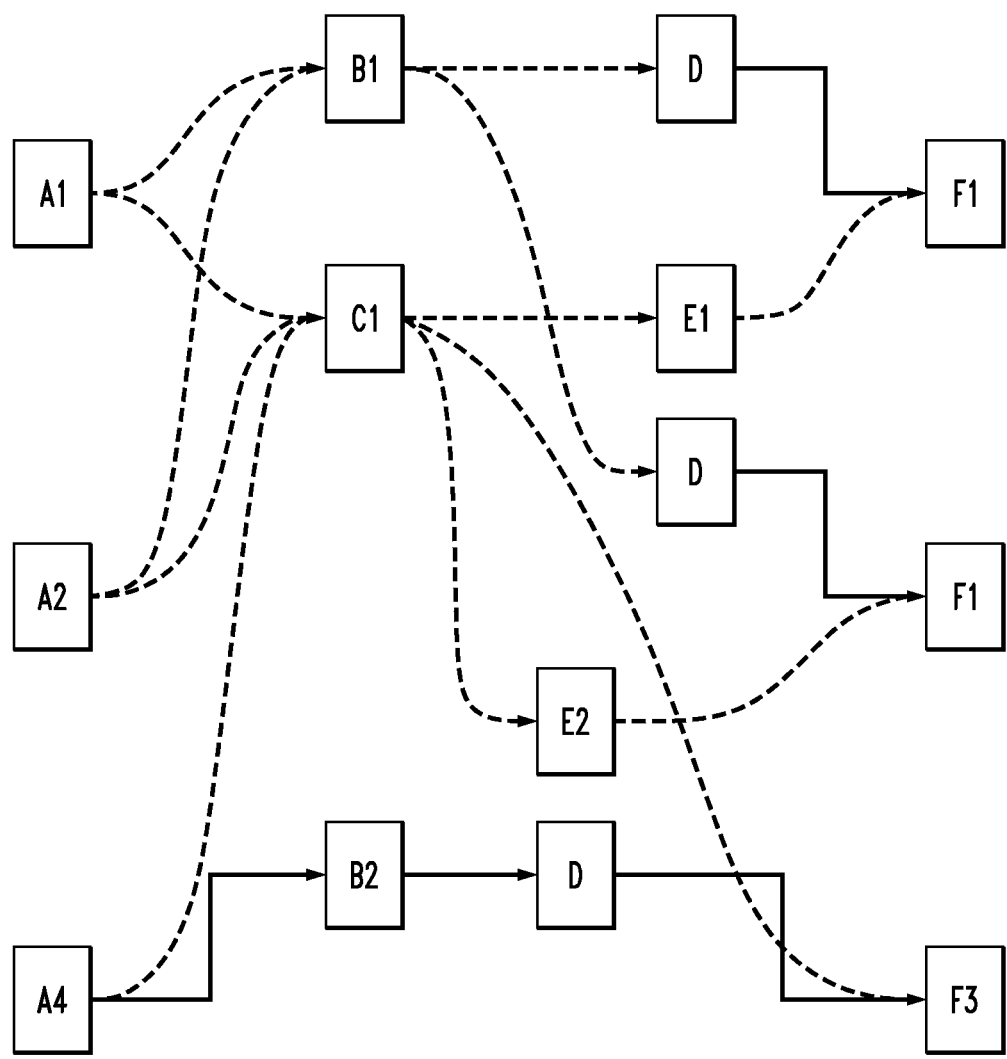

FIG. 3A through FIG. 3C are diagrams illustrating an example incremental development scenario, according to an embodiment of the present invention. In FIG. 3A, the following example is provided as follows. After developing a flow pattern and providing it to enterprise analysts, the application architect determines that two new data sources have to be introduced into the pattern. Accordingly, the application architect introduces new components A4 and A5 that inherit from A into the flow pattern, and the he/she stops the server and deploys the updated pattern (assume that right before stopping the server, the run-time space is as depicted in FIG. 3A). The architect also deploys the new pattern with the two new sources and starts the flow composer tool.

Further, an enterprise analyst X creates the flow depicted in FIG. 3B. Accordingly, the run-time in the next step will be as depicted in FIG. 3C. In FIG. 3C, note that the system "recognized" the fact that C1 has not changed since the last flow pattern and therefore is able to use the deployed C1 artifact with the new flow pattern. In deciding that this is the same C1, one or more embodiments of the invention incorporate the feature that components are uniquely identified by a combination of all of the following example attributes: name, input and output ports (signature), inheritance parents, platform-specific body or composite graph, depending on the component type, set of parameters, actual parameter values provided by the user at deployment time, and (optionally) developer-provided tags. Also, if a component C is part of a sub-graph (or sub-flow) in a hierarchical stream processing language, the "containment" set, that is, the set of sub-graph components that contain C there within (starting from the immediate container of C upwards) can be used to determine whether component C changed. The combination of these attributes is referred to as the "signature" of C.

Additionally, note that in the scenario described above, although a flow was deployed with the new source A4, A4 did not get automatically connected to the existing shareable analytics (such as B1). It was only connected to the analytic specified in the flow created by the user, namely C (C1). However, when new sources are added and there are many running analytics, it can be expected for these sources to be connected automatically to the analytics that can use them (the possible connections are described by the flow pattern).

Figure 4A:
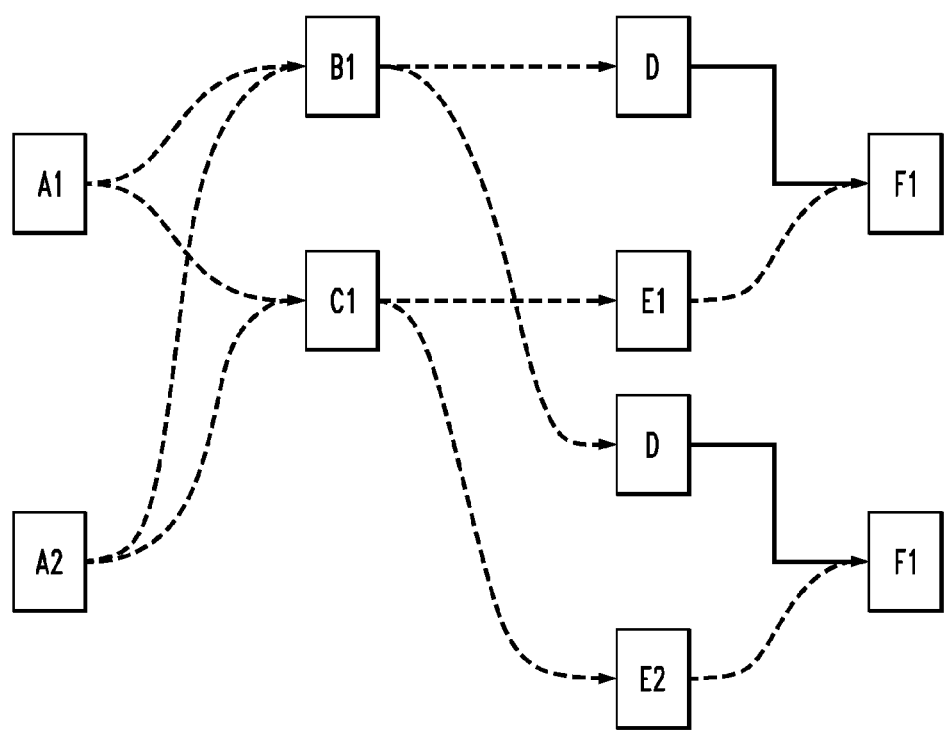
FIG. 4A through FIG. 4C are diagrams illustrating an open @share semantics scenario, according to an embodiment of the present invention.
Figure 4B:
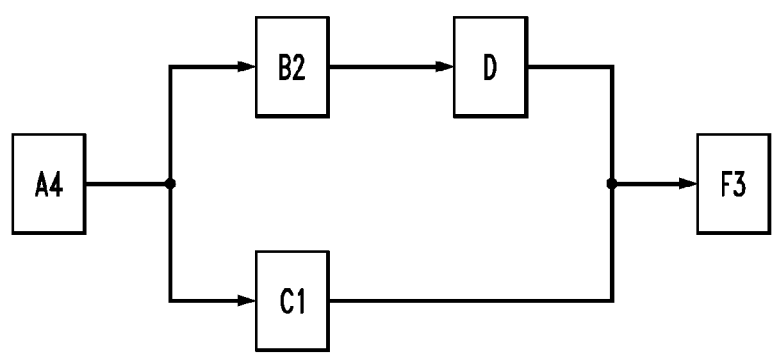
Figure 4C:
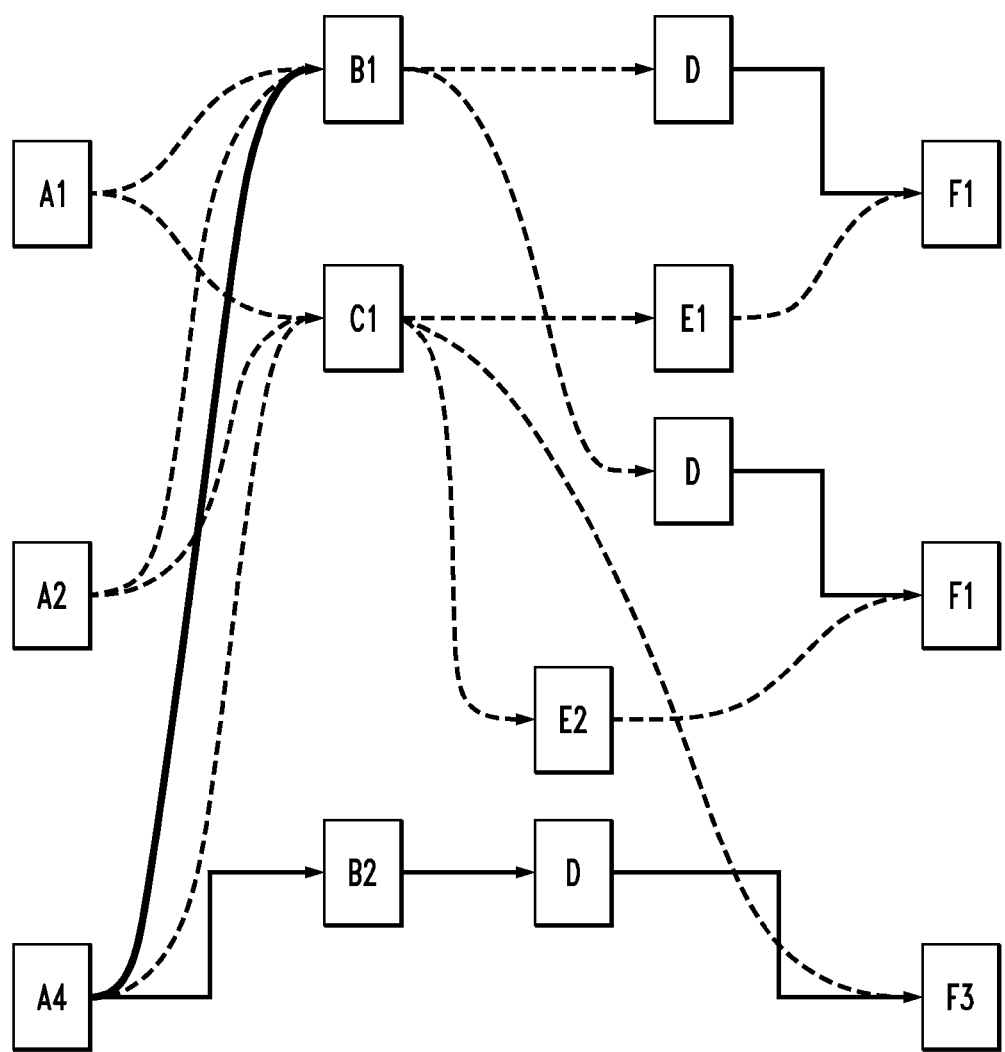

FIG. 4A through FIG. 4C are diagrams illustrating an open @share semantics scenario, according to an embodiment of the present invention. In FIG. 4A, under OPEN @share semantics, when the run-time is as shown in FIG. 4A, and the user creates the flow in FIG. 4B, then the new run-time will appear as depicted in FIG. 4C.

In FIG. 4C, note that the bold curve (between A4 and B1) was not present under the standard @share semantics. To achieve the same effect with the standard @share semantics, the user would have had to deploy a flow that explicitly connects A4 to B1. The number of such extra flows that need to be created could be very large if the number of deployed @share-able artifacts is large. One or more embodiments of the invention can, for example, be configurable to run in standard or open @share mode. Additionally, one or more embodiments of the invention can include implementing an optional component that will not require the user to submit a flow containing A4 in order to connect A4 with B1, C1. Instead, as soon as a flow pattern gets updated, the planner will automatically be called to determine which new connections need to be made, and those connections will be made automatically.

It can also be noted, by way of example, that @share-ing will work for both platform-specific components as well as graph composites. In case a @share graph composite contains within it @share platform-specific components, @share semantics will be assumed to work at the highest composite level.

Figure 5A:
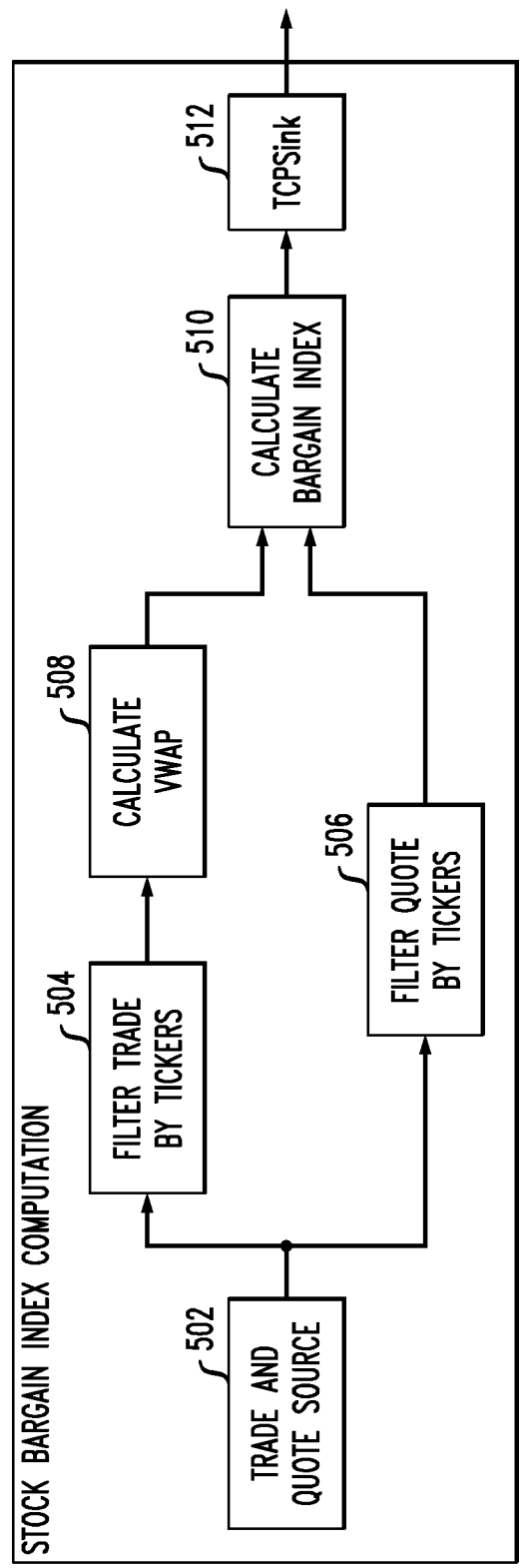
FIG. 5A is a diagram illustrating an example stream processing application flow, according to an embodiment of the present invention.

FIG. 5A is a diagram illustrating an example stream processing application flow, according to an embodiment of the present invention. By way of illustration, FIG. 5A depicts a trade and quote (TAQ) source component 502, a filter trade by tickers component 504, a filter quote by tickers component 506, a calculate volume weighted average price (VWAP) component 508, a calculate bargain index component 510, and a TCPSink component 512 (which sends any data it receives to a specified network address using the TCP protocol).

Figure 5B:
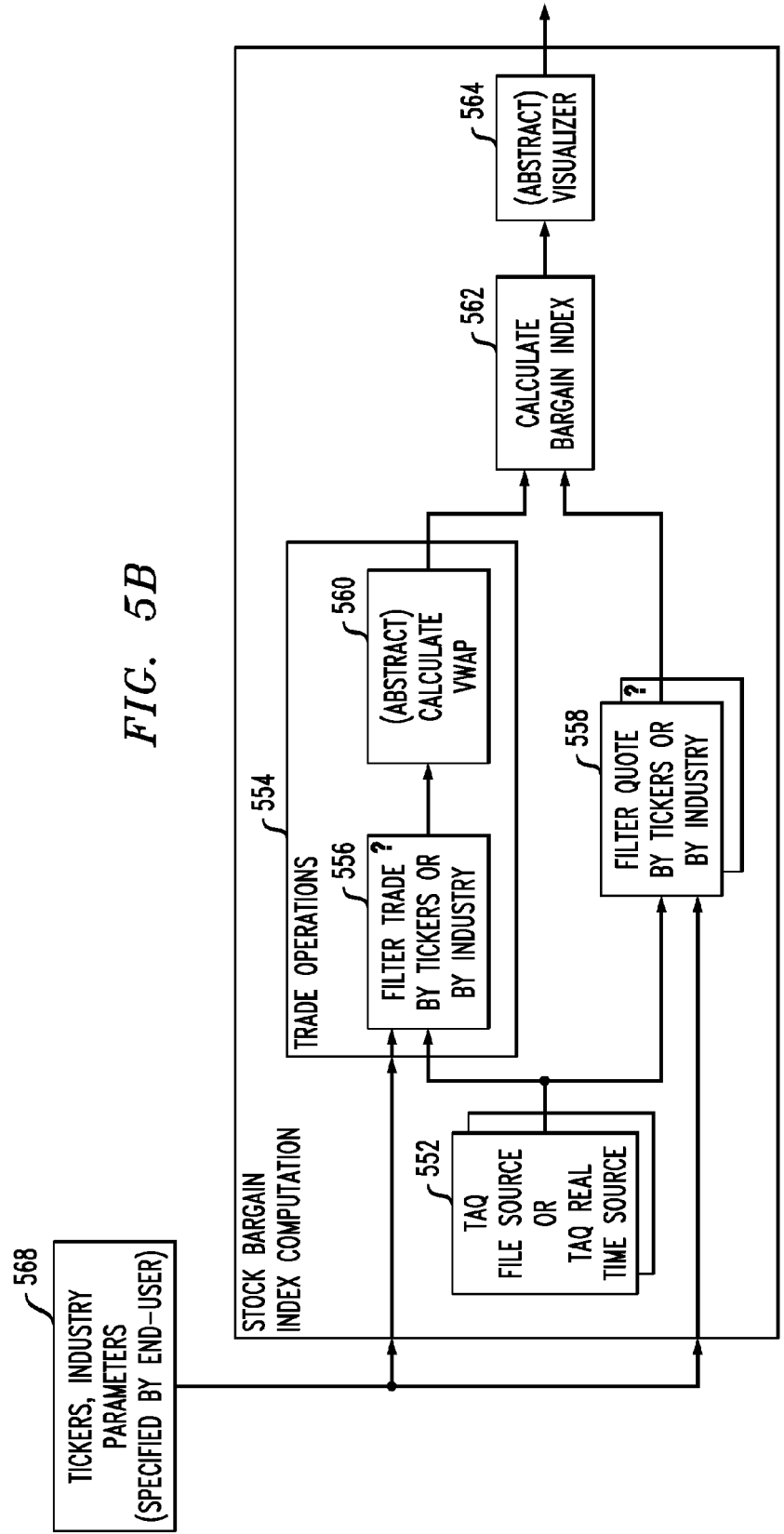
FIG. 5B is a diagram illustrating an example composition pattern for the stream processing application, according to an embodiment of the present invention.

FIG. 5B is a diagram illustrating an example composition pattern for the stream processing application, according to an embodiment of the present invention. By way of illustration, FIG. 5B depicts a TAQ file source or TAQ real time source component 552, a trade operations sub-flow pattern 554 including a (optional) filter trade by tickets or by industry component 556 and a (abstract) calculate VWAP component 560. FIG. 5B also depicts a filter quote by tickets or by industry component 558, a (concrete) calculate bargain index component 562, and a (abstract) visualizer component 564. Further, FIG. 5B depicts tickers and industry parameters 568 (as specified by an end-user), which are provided to components 556 and 558. As noted herein, abstract components can be replaced by any concrete descendant.

While FIG. 5A depicts one stream processing flow, FIG. 5B depicts a set of stream processing flows that all match the same pattern. For instance, the flow in FIG. 5A can be obtained from the pattern in FIG. 5B, for example, by choosing a specific trade and quote source (file or real-time), but choosing to filter trades by tickers, by choosing a concrete way of calculating the VWAP (out of many possible ways), etc. In this way, composition patterns are an effective way to encode multiple similar application combinations in a single program pattern. Patterns are effective in combination with sharing because applications created from a pattern such as the one depicted in FIG. 5B are likely to contain common sub-flows and components. Additionally, FIG. 5B is a concrete example of a pattern, whereas FIG. 1, for example, depicts an example of a pattern with arbitrary/example components.

As described herein, one or more embodiments of the invention can include incorporating sharing with automated composition. Accordingly, flow patterns can be used for automated composition, and sharing enables the composer to re-use running components in the plan. This technique works very well, for example, together with automated composition by annotating elements of a pattern with @share annotations. Additionally, the same technique applies equally as well in environments where patterns/automated composition are not available, but instead individual stream processing flows (such as FIG. 5A) are received and not patterns (such as FIG. 5B) that contain @share annotations on the component in the stream processing flow. It is effectively illustrated via a case where different flows from the same pattern (that is, that will have components in common) are being deployed in succession.

As supported herein, the techniques described herein can include the following steps. A flow F created according to a pattern P (for example, by an automated planner) is received. The sub-flows of F that are already running can be determined by performing graph matching against a run-time flow repository (for example, hierarchically, from largest sub-flows to smaller sub-flows). Code for F can be generated. Instead of generating code for the sub-flows that are already running, one or more embodiments of the invention can generate connectors to the existing sub-flows (import/export statements). Also, for each shareable component of F that is not already running, one or more embodiments of the invention include generating a separate streaming job and connecting the parts by imports/exports. Further, the generated code of F is deployed and the registry is updated.

Figure 6:
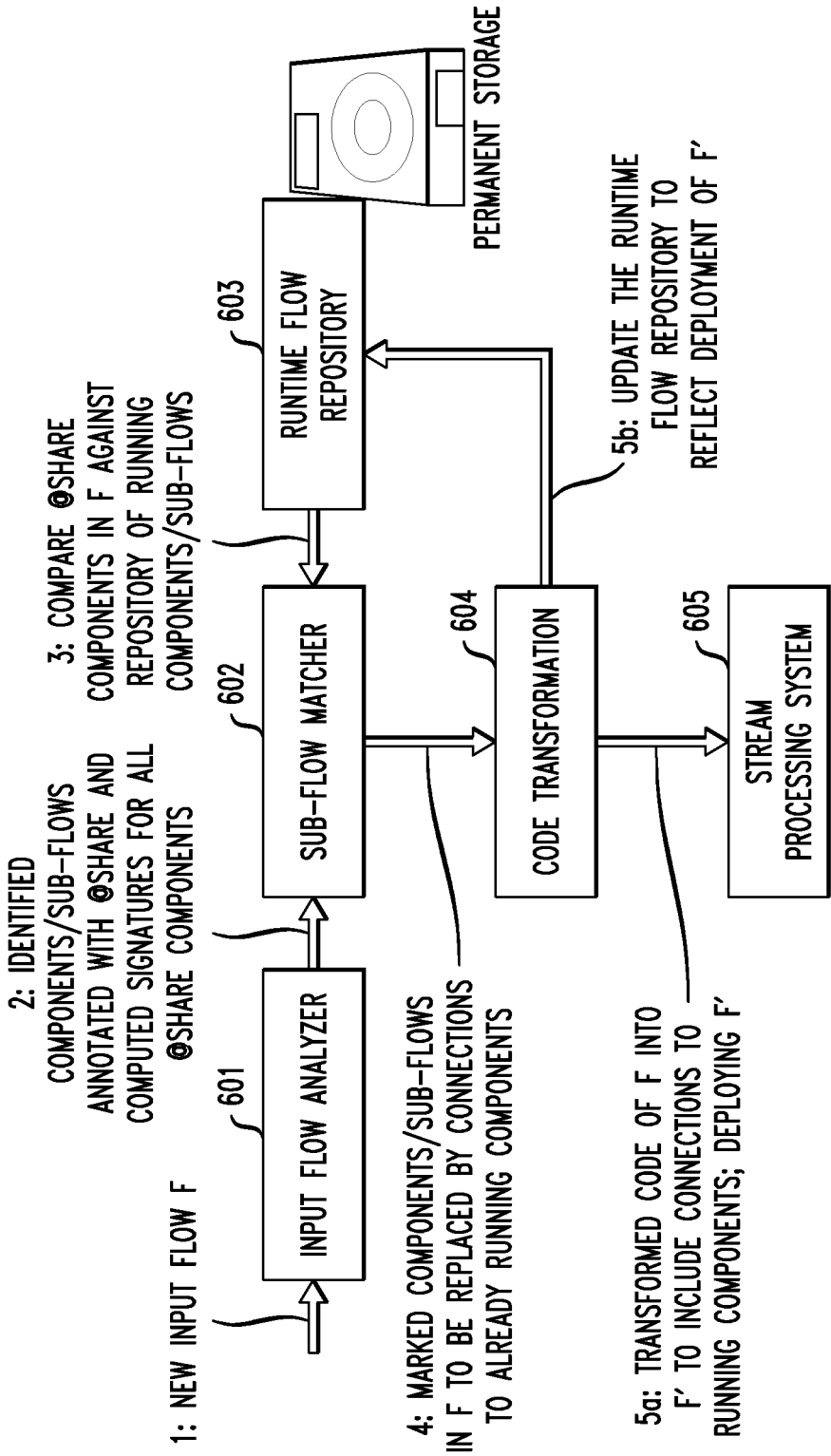
FIG. 6 is a block diagram illustrating an example embodiment, according to an aspect of the invention.

FIG. 6 is a block diagram illustrating an example embodiment, according to an aspect of the invention. By way of illustration, FIG. 6 depicts an input flow analyzer module 601, a sub-flow matcher module 602, a run-time flow repository module 603, a code transformation module 604, and, a stream processing system 605. Module 601 analyzes any newly received input flow F (for instance, from an analytic composer), identifies all components annotated with @share and computes the signature of all such components. Module 602 receives the flow F enriched with the signatures of @shareable components and queries the run-time flow repository (module 603) to determine if the signatures match any components/sub-flows that are already running. Any such components are marked accordingly. Module 604 transforms the code of flow F to remove the code for the components or sub-flows that are already running and replace these with import/export statements that connect to the running code. Also, module 604 uses a platform-specific deployment tool (for example, streamtool for IBM InforSphere Streams) to deploy the transformed flow (for example, to a stream processing system) as well as updates the run-time flow repository in light of this new deployment.

Figure 7:
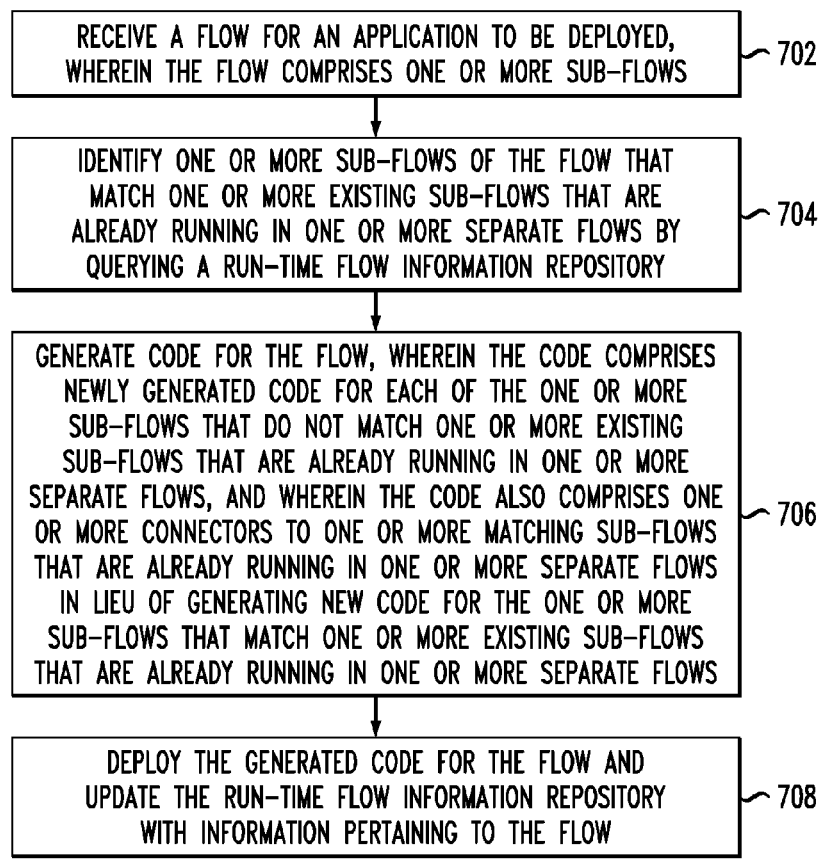
FIG. 7 is a flow diagram illustrating techniques for generating code for a flow, according to an embodiment of the invention.

FIG. 7 is a flow diagram illustrating techniques for generating code for a flow, according to an embodiment of the present invention. Step 702 includes receiving a flow for an application to be deployed, wherein the flow comprises one or more sub-flows. This step can be carried out, for example, using an input flow analyzer module. The flow for an application to be deployed can be defined in a composition language.

Step 704 includes identifying one or more sub-flows of the flow that match one or more existing sub-flows that are already running in one or more separate flows by querying a run-time flow information repository. This step can be carried out, for example, using a sub-flow matcher module. Identifying sub-flows of the flow that match existing sub-flows that are already running includes performing matching of the sub-flows against a repository of running flows (for example, hierarchically, from largest sub-flows to smaller sub-flows). One or more embodiments of the invention also include updating the repository of running flows to include the generated code for the flow.

Additionally, as described herein, a sub-flow matches an existing sub-flow when the sub-flow performs one or more same functions and has one or more same inputs and one or more same outputs (that is, the same signature). Also, a sub-flow matches an existing sub-flow if the existing sub-flow is designated as shareable.

Step 706 includes generating code for the flow, wherein the code comprises newly generated code for each of the one or more sub-flows that do not match one or more existing sub-flows that are already running in one or more separate flows, and wherein the code also comprises one or more connectors to one or more matching sub-flows that are already running in one or more separate flows in lieu of generating new code for the one or more sub-flows that match one or more existing sub-flows that are already running in one or more separate flows. This step can be carried out, for example, using a code transformation module.

Step 708 includes deploying the generated code for the flow (that is, initiate execution of the code for the new flow) and updating the run-time flow information repository with information pertaining to the flow, which can be carried out, for example, using a run-time flow repository module.

The techniques depicted in FIG. 7 also include reusing the deployed code for the flow in an existing environment. Reusing the deployed code for the flow in an existing environment can include receiving a command to deploy a new flow based program, identifying reusable components of the new flow based program that are already deployed in the existing environment, wherein the existing environment includes the deployed code for the flow and deployed code for additional flows, and generating a new flow component for any part of the new flow that is not already deployed in the existing environment. Further, reusing the deployed code for the flow in an existing environment can include establishing connections from new flow components that are not already deployed in the existing environment to already deployed components, as well as deploying the new flow into the environment, wherein the new flow includes the new flow components that are not already deployed in the existing environment and the connections from new flow components that are not already deployed in the existing environment to already deployed components.

As detailed herein, the existing environment can include a flow-based program created according to one or more composition patterns. Each composition pattern includes, for example, specification of sharing properties of one or more components. Additionally, during deployment of a new flow, one or more embodiments of the invention include identifying reusable components that are already deployed, establishing connection from the new flow to the reusable components that are already deployed, as well as inserting one or more additional flow components to facilitate reuse in one or more flows to be subsequently deployed. By way of example, consider having shareable component A and shareable component B. A will export its output (assume there is a single one for simplicity) under a key, for example, keyAOut, and B will import its input (assume a single one) under a key, for example, keyBIn. Any component that will receive data from A (that is, follow A in the flow) will have to import from A using the keyAOut key. Any component that will feed data into B (that is, is before B in the flow) will have to export using the keyBIn key. However, if A is followed by B in some flow from the pattern, one or more embodiments of the invention would include inserting a component that does not do any computation but imports data using keyAOut and exports it using keyBIn to make the connection happen. This happens only when @share components succeed each other in the flow.

The techniques depicted in FIG. 7 can also include allowing changes in a composition pattern while enabling reuse of artifacts of deployed code according to an earlier version of the composition pattern, as well as modifying already deployed flows when new shareable components become available.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include an input flow analyzer module, a sub-flow matching module, a run-time flow repository module, and a code transformation module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
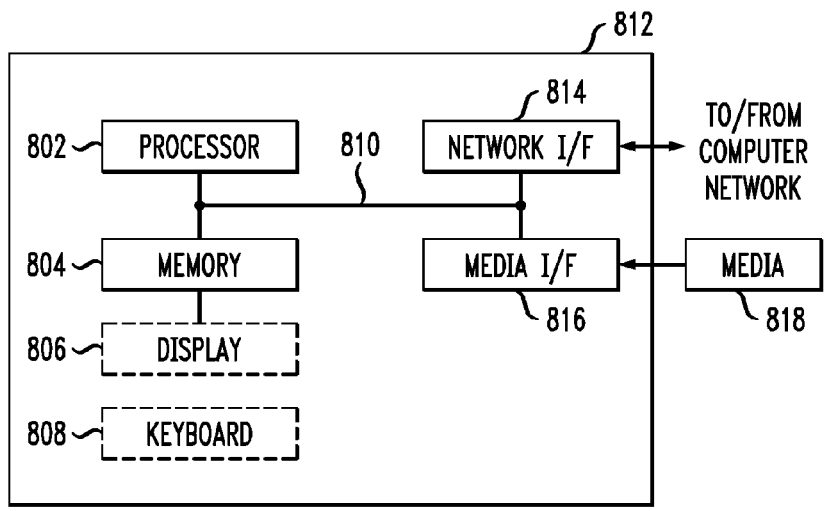
FIG. 8 is a system diagram of an exemplary computer system on which at least one embodiment of the invention can be implemented.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 6. The method steps can then be carried out using the distinct software modules and/or sub-modules of the system, as described above, executing on one or more hardware processors 802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling, for a multi job complex application, a user to connect to already existing pieces.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for generating code for a flow, wherein the method comprises:
    receiving a flow for an application to be deployed, wherein the flow comprises one or more sub-flows;
    identifying one or more of the sub-flows of the flow that match a respective one of one or more existing sub-flows that are already running in one or more separate flows by querying a run-time flow information repository;
    generating code for the flow by (i) generating new code for each respective one of the one or more sub-flows that do not match a respective one of the one or more existing sub-flows that are already running in the one or more separate flows, (ii) generating one or more import/export statements that establish a connection to each respective one of the one or more existing sub-flows that are already running in the one or more separate flows that match a respective one of the, and (iii) inserting a respective one of the one or more generated import/export statements in each of one or more positions in the code that correspond to each respective one of the one or more sub-flows that match a respective one of the one or more existing sub-flows that are already running in the one or more separate flows;

annotating one or more components of the generated code that will be active in the run-time for more than a predetermined period of time, wherein said annotating comprises applying an @share annotation to each of the one or more components;

specifying one of multiple sharing contexts to be attributed to each of said annotated components; and deploying the generated code for the flow and updating the run-time flow information repository with information pertaining to the flow.

2. The method of claim 1, wherein the flow for an application to be deployed is defined in a composition language.

3. The method of claim 1, wherein identifying one or more sub-flows of the flow that match a respective one of one or more existing sub-flows that are already running comprises performing matching of each respective one of the one or more sub-flows against a repository of running flows.

4. The method of claim 3, further comprising updating the repository of running flows to include the generated code for the flow.

5. The method of claim 1, wherein a sub-flow matches an existing sub-flow when the sub-flow performs one or more same functions and has one or more same inputs and one or more same outputs.

6. The method of claim 1, wherein a sub-flow matches an existing sub-flow if the existing sub-flow is designated as shareable.

7. The method of claim 1, further comprising reusing the deployed code for the flow in an existing environment.

8. The method of claim 7, wherein reusing the deployed code for the flow in an existing environment comprises:

receiving a command to deploy a new flow based program;

identifying one or more reusable components of the new flow based program that are already deployed in the existing environment, wherein the existing environment comprises the deployed code for the flow and deployed code for one or more additional flows;

generating a new flow component for any part of the new flow that is not already deployed in the existing environment;

establishing one or more connections from one or more new flow components that are not already deployed in the existing environment to one or more already deployed components; and deploying the new flow into the environment, wherein the new flow comprises the one or more new flow components that are not already deployed in the existing environment and the one or more connections from one or more new flow components that are not already deployed in the existing environment to one or more already deployed components.

9. The method of claim 8, wherein the existing environment comprises a flow-based program created according to one or more composition patterns.

10. The method of claim 9, wherein each composition pattern includes specification of sharing properties of one or more components.

11. The method of claim 9, further comprising, during deployment of a new flow:

identifying one or more reusable components that are already deployed; and establishing connection from the new flow to the one or more reusable components that are already deployed.

12. The method of claim 11, further comprising inserting one or more additional flow components to facilitate reuse in one or more flows to be subsequently deployed.

13. The method of claim 8, further comprising allowing one or more changes in a composition pattern while enabling reuse of one or more artifacts of deployed code according to an earlier version of the composition pattern.

14. The method of claim 1, further comprising modifying one or more already deployed flows when one or more new shareable components become available.

15. The method of claim 1, further comprising providing a system, wherein the system comprises one or more distinct software modules, each of the one or more distinct software modules being embodied on a tangible computer-readable recordable storage medium, and wherein the one or more distinct software modules comprise an input flow analyzer module, a sub-flow matcher module, a run-time flow repository module and a code transformation module executing on a hardware processor.

16. A computer program product comprising a non-transitory tangible computer readable recordable storage medium including computer useable program code for generating code for a flow, the computer program product including:

computer useable program code for receiving a flow for an application to be deployed, wherein the flow comprises one or more sub-flows;

computer useable program code for identifying one or more of the sub-flows of the flow that match a respective one of one or more existing sub-flows that are already running in one or more separate flows by querying a run-time flow information repository;

computer useable program code for generating code for the flow by (i) generating new code for each respective one of the one or more sub-flows that do not match a respective one of the one or more existing sub-flows that are already running in the one or more separate flows, (ii) generating one or more import/export statements that establish a connection to each respective one of the one or more existing sub-flows that are already running in the one or more separate flows that match a respective one of the one or more sub-flows of the flow, and (iii) inserting a respective one of the one or more generated import/export statements in each of one or more positions in the code that correspond to each respective one of the one or more sub-flows that match a respective one of the one or more existing sub-flows that are already running in the one or more separate flows;

computer useable program code for annotating one or more components of the generated code that will be active in the run-time for more than a predetermined period of time, wherein said annotating comprises applying an @share annotation to each of the one or more components;

computer useable program code for specifying one of multiple sharing contexts to be attributed to each of said annotated components; and computer useable program code for deploying the generated code for the flow and updating the run-time flow information repository with information pertaining to the flow.

17. The computer program product of claim 16, wherein the computer useable program code for identifying one or more sub-flows of the flow that match a respective one of one or more existing sub-flows that are already running comprises computer useable program code for performing matching of each respective one of the one or more sub-flows against a repository of running flows.

18. The computer program product of claim 17, further comprising computer useable program code for updating the repository of running flows to include the generated code for the flow.

19. The computer program product of claim 16, wherein a sub-flow matches an existing sub-flow when the sub-flow performs one or more same functions and has one or more same inputs and one or more same outputs.

20. The computer program product of claim 16, further comprising computer useable program code for reusing the deployed code for the flow in an existing environment, wherein the comprising computer useable program code for reusing the deployed code for the flow in an existing environment comprises:
   comprising computer useable program code for receiving a command to deploy a new flow based program;
   comprising computer useable program code for identifying one or more reusable components of the new flow based program that are already deployed in the existing environment, wherein the existing environment comprises the deployed code for the flow and deployed code for one or more additional flows;
   comprising computer useable program code for generating a new flow component for any part of the new flow that is not already deployed in the existing environment;
   comprising computer useable program code for establishing one or more connections from one or more new flow components that are not already deployed in the existing environment to one or more already deployed components; and
   comprising computer useable program code for deploying the new flow into the environment, wherein the new flow comprises the one or more new flow components that are not already deployed in the existing environment and the one or more connections from one or more new flow components that are not already deployed in the existing environment to one or more already deployed components.

21. A system for generating code for a flow, comprising:
   a memory; and
   at least one processor coupled to the memory and operative to:
   receive a flow for an application to be deployed, wherein the flow comprises one or more sub-flows;
   identify one or more of the sub-flows of the flow that match a respective one of one or more existing sub-flows that are already running in one or more separate flows by querying a run-time flow information repository;
   generate code for the flow by (i) generating new code for each respective one of the one or more sub-flows that do not match a respective one of the one or more existing sub-flows that are already running in the one or more separate flows, (ii) generating one or more import/export statements that establish a connection to each respective one of the one or more existing sub-flows that are already running in the one or more separate flows that match a respective one of the one or more sub-flows of the flow, and (iii) inserting a respective one of the one or more generated import/export statements in each of one or more positions in the code that correspond to each respective one of the one or more sub-flows that match a respective one of the one or more existing sub-flows that are already running in the one or more separate flows;
   annotate one or more components of the generated code that will be active in the run-time for more than a predetermined period of time, wherein said annotating comprises applying an @share annotation to each of the one or more components;
   specify one of multiple sharing contexts to be attributed to each of said annotated components; and
   deploy the generated code for the flow and update the run-time flow information repository with information pertaining to the flow.

22. The system of claim 21, wherein the at least one processor coupled to the memory operative to identify one or more sub-flows of the flow that match a respective one of one or more existing sub-flows that are already running is further operative to perform matching of each respective one of the one or more sub-flows against a repository of running flows.

23. The system of claim 22, wherein the at least one processor coupled to the memory is further operative to update the repository of running flows to include the generated code for the flow.

24. The system of claim 21, wherein a sub-flow matches an existing sub-flow when the sub-flow performs one or more same functions and has one or more same inputs and one or more same outputs.

25. The system of claim 21, wherein the at least one processor coupled to the memory is further operative to reuse the deployed code for the flow in an existing environment, and wherein the at least one processor coupled to the memory operative to reuse the deployed code for the flow in an existing environment is further operative to:
   receive a command to deploy a new flow based program;
   identify one or more reusable components of the new flow based program that are already deployed in the existing environment, wherein the existing environment comprises the deployed code for the flow and deployed code for one or more additional flows;
   generate a new flow component for any part of the new flow that is not already deployed in the existing environment;
   establish one or more connections from one or more new flow components that are not already deployed in the existing environment to one or more already deployed components; and
   deploy the new flow into the environment, wherein the new flow comprises the one or more new flow components that are not already deployed in the existing environment and the one or more connections from one or more new flow components that are not already deployed in the existing environment to one or more already deployed components.

* * * * *